3,006,900
PRODUCTION OF WATER-SOLUBLE COPOLYMERS OF METHACRYLAMIDE AND N-VINYLPYRROLIDONE
Hans Fikentscher and Hans Wilhelm, Ludwigshafen (Rhine), Germany, assignors to Badische Anilin- & Soda-Fabrik Aktiengesellschaft, Ludwigshafen (Rhine), Germany
No Drawing. Filed May 13, 1958, Ser. No. 734,830
Claims priority, application Germany Aug. 22, 1953
4 Claims. (Cl. 260—78)

This invention relates to the production of high-molecular weight water-soluble copolymer products of methacrylamide and at least 6% by weight of N-vinylpyrrolidone. The invention further relates to aqueous emulsions and dispersions of water-insoluble substances which contain high-molecular weight polymerization products of methylacrylamide and N-vinylpyrrolidone as an emulsifying or dispersing agent. In addition to methacrylamide and N-vinylpyrrolidone, the copolymers of the invention may also contain minor proportions of other copolymerized unsaturated carboxylic acid amides having 3 to 4 carbon atoms in the monomeric form.

Of the polymers of methacrylamide, only those of a low degree of polymerization, which can be obtained for example by precipitation polymerization in a benzene or toluene medium, are soluble in water, whereas the higher polymers which are of greater industrial value, while being soluble in the alkaline region, only swell in water without dissolving therein.

It has already been proposed to render high molecular polymers of unsaturated carboxylic acid amides water-soluble by introducing into them up to 5% of carboxylic acids, with reference to monomeric acid amide. These polymers of methacrylamide containing carboxyl groups have the industrial drawback, however, that they are only soluble as salts in the neutral or alkaline range and are precipitated from aqueous solutions in the acid pH range.

We have now found that high molecular polymers of methacrylamide or mixtures of the same with other unsaturated carboxylic acid amides having 3 to 4 carbon atoms are obtained which have good solubility in water throughout the entire pH range at room temperature by copolymerizing a mixture of a monomeric amide, particularly methacrylamide, and at least 6% up to about 95%, preferably about 10 to 90%, of N-vinylpyrrolidone with reference to the total weight of monomers, such that the copolymer is characterized by a K-value of at least 25, preferably at least about 35.5, in a 1% aqueous solution at a pH of 7.

Suitable catalysts for the production of the said copolymers which are water-soluble in the entire pH range are azo-bis-nitriles, as for example azo-bis-isobutyronitrile. In order to disperse the azo-bis-nitriles finely in the aqueous solution, they are preferably dissolved in monomeric N-vinylpyrrolidone before the latter is added to the aqueous solution; they may, however, also be added directly to the reaction mixture.

It is difficult to prepare copolymers of N-vinylpyrrolidone and methacrylamide which are water-soluble in the entire pH range by the use of the peroxidic catalysts, such as hydrogen peroxide or potassium persulfate, conventionally employed for polymerizations in aqueous solution. In this case it is necessary to take extreme care during the polymerization for the careful maintenance of a narrow neutral pH range in order to avoid decomposition of the N-vinylpyrrolidone on the one hand and splitting off of ammonia from the methacrylamide on the other hand. A further drawback attendant on the use of water-soluble peroxides is that the K-values of the products are lower than when using azo-bis-nitriles and that the peroxides must be added in incremental portions during the polymerization reaction. If an amount of peroxide sufficient for the complete polymerization is added all at once, this leads to a considerable further lowering of the K-value.

On the other hand these drawbacks are avoided by the use of azo-bis-nitriles as catalysts for the copolymerization of methacrylamide and N-vinylpyrrolidone in aqueous solution. The whole amount of these catalysts may be added at once. No precautionary measures are necessary for adding the catalysts and carrying out the polymerization at raised temperatures.

The azo-bis-nitriles used are compounds of the general formula

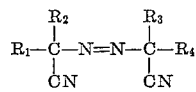

wherein $R_1$ and $R_4$ are monovalent aliphatic or cycloaliphatic radicals which contain up to 8 carbon atoms, preferably up to 6 carbon atoms, and may bear substituents, for example, carboxyl groups, and wherein $R_2$ and $R_3$ can be monovalent aliphatic, cycloaliphatic or aromatic radicals which contain up to 8 carbon atoms, and may bear substituents, for example, alkyl groups.

The said compounds can be obtained in conventional manner by dehydrogenation of the hydrazo compounds prepared from ketones, hydrazine and hydrocyanic acid. Preferred compounds of the said type are, for example, azo-bis-isobutyric acid nitrile, azo-bis-diethylacetic acid nitrile, azo-bis-cyclohexanecarboxylic acid nitrile and azo-bis-α-phenylpropionic acid nitrile.

High-molecular weight polymers obtained in accordance with the invention by polymerizing N-vinyl-pyrrolidone in an amount of from upwards of at least 6% to about 95%, with methacrylamide have good solubility in water over the entire pH range. The designation high-molecular weight polymers is given herein to those polymers which as a 1% solution in water at pH 7.0 have a K-value of at least 25, more preferably of at least about 35.5. High-molecular weight polymers having K-values up to 130 are very useful products, it being understood that even higher K-values are useful too. For detailed information on the determination of the K-value, reference should be made to the paper by Fikentscher published in "Cellulosechemie" 13 (1932), 58, and to Schildknecht, "Vinyl and Related Polymers," p. 676, John Wiley & Sons, Inc., New York, 1952.

Examples of unsaturated carboxylic acid amides with 3 to 4 carbon atoms which are especially suitable for copolymerization with methacrylamide and N-vinylpyrrolidone are acrylamide and crotonamide, whereas fumaric acid diamide may be mentioned among unsaturated dicarboxylic acid diamides. The copolymers thus formed are to contain not more than 50% by weight of any of the said other carboxylic acid amides with 3 to 4 carbon atoms or of a mixture of such carboxylic acid amides, with reference to the total weight of the copolymer. The proportion of these other ethylenically-unsaturated carboxylic acid amides in the copolymer must not exceed the proportion of the methacrylamide in the copolymer.

The copolymers of the invention are prepared at a temperature of between 20° and 150° C., the preferred temperature being about 40° to 100° C. The polymerization is normally carried out at ordinary pressure, but increased pressure, for example pressures up to 100 atmospheres, can also be used.

Copolymers from methacrylamide and N-vinyl-pyrrolidone-2 are superior to pure polyvinyl-pyrrolidone and to prior art copolymers which contain N-vinylpyrrolidone- 2 and other monomeric polymerizable compounds, such as acrylonitrile, in more ways than one. Thus, they are better emulsifiers and, bearing reactive acid amide groups, are capable of entering into subsequent reactions. Thus, for example, part of the amide groups can be saponified and the carboxylic acid groups formed can be obtained in the form of ammonium salts. It is advantageous to saponify only so many acid amide groups that the copolymers remain soluble in the acid range, for example at pH 4.8. Copolymers of methacrylamide with a high percentage of vinylpyrrolidone have also a distinct advantage over pure polyvinyl-pyrrolidone in that their viscosity or their K-value is less dependent on the pH of the solution, as can be seen on the following Table I.

TABLE I

*Dependency of K-value on pH value*

| Ratio of methacrylamide to N-vinylpyrrolidone | pH | K-value | pH | K-value | pH | K-value | pH | K-value |
|---|---|---|---|---|---|---|---|---|
| 30:70 | 2.97 | 79.0 | 5.55 | 82.0 | 8.48 | 86.0 | 11.5 | 89.0 |
| 20:80 | 2.87 | 88.0 | 5.57 | 89.5 | 8.85 | 91.0 | 11.5 | 92.0 |
| 10:90 | 2.81 | 96.5 | 5.10 | 97.0 | 9.40 | 97.5 | 11.5 | 97.0 |
| 0:100 | 2.9 | 92.5 | ---- | ------ | 9.20 | 103.0 | 11.0 | 107.5 |

The highly viscous aqueous solutions of the copolymers of methacrylamide and at least 6 to 95% of N-vinylpyrrolidone are suitable for all purposes for which highly viscous aqueous solutions or pastes are required. On drying they leave behind clear, transparent, hard films. Their solutions and films are stable to bacteria and fungus and this constitutes a considerable technical advance over a water-soluble highly polymeric natural product, as for example gum arabic, tragacanth, dextrine or agar-agar.

The copolymers according to this invention are also eminently suitable as protective colloids or dispersing or emulsifying agents in the production of aqueous emulsions and dispersions with substances not miscible with water, as for example oils, fats, waxes and hydrocarbons. They are therefore of importance for the production of pharmaceutical products, disinfectants, plant protectives or benzine soaps, aqueous oil lacquers, pastes, salves and the like. Furthermore, water-insoluble polymerizable compounds may be polymerized alone or in admixture with other unsaturated monomers in water with the aid of the said emulsifying or dispersing agents. Monomers of the said kind suitable for emulsion or dispersion polymerization are well known and include, for example: vinyl esters of organic acids; esters of unsaturated carboxylic acids, for example, acrylic and methacrylic acid esters; vinyl halides; vinylidene halides; N-vinyl compounds, as for example vinylcarbazole; aromatic C-vinyl compounds as for example styrene, its homologues and derivatives; vinyl ketones; and mixtures of the same with each other and with other unsaturated compounds, as for example unsaturated mono- and dicarboxylic acids, their salts, esters and amides, unsaturated nitriles, alcohols or hydrocarbons. As emulsifiers in polymerizations, the copolymers of the invention are far superior to the copolymers of acrylamide and N-vinylpyrrolidone.

Other emulsifying agents and dispersing agents, wetting agents or buffer substances may be co-employed in association with the copolymers of N-vinylpyrrolidone and methacrylamide. The said copolymers are equally well suited as protective colloids for the production of polymers in ether emulsion or dispersion. They are especially useful in the acid pH range. Generally, the water-insoluble monomers dispersed in aqueous media for emulsion polymerization belong to a broad class of known compounds, as indicated in the preceding paragraph, and may be characterized as monomers which contain the polymerizable $>C=C<$ group and which are capable of being subjected to an emulsion polymerization. The new protective colloids are preferably added in amounts of 1 to 4% (with reference to the unsaturated compounds to be polymerized) to the polymerization medium, but smaller amounts, as for example 0.05%, or more than 4% may be used. The polymerizations can be carried out while using conventional polymerization catalysts, and the monomers may be allowed to flow into the aqueous solution of the protective colloid or the monomer to be polymerized may be mixed with the entire quantity of protective colloid solution.

The polymer emulsions and dispersions prepared with the new protective colloids are stable, compatible with pigments, may be spread well and dry well. They are suitable for coatings, as assistants in the textile industry, for example for impregnations, preparations, dressings, finishes and sizes, as coatings for a great variety of substances, as for example leather, as adhesives, for priming compositions and for other purposes.

The term "dispersion" is employed broadly herein and particularly in the claims to include dispersions, emulsions, suspensions and the like wherein water forms a continuous phase in which the dispersed phase is a water-insoluble substance whether a liquid or finely particulated solid. Such dispersions may contain additional fillers, thickeners or the like within the scope of the invention.

The following examples will further illustrate this invention but the invention is not restricted to these examples. The parts are by weight.

EXAMPLE 1

300 parts of N-vinylpyrrolidone, in which are dissolved 2 parts of azo-bis-isobutyronitrile, are added to a solution of 700 parts of methacrylamide in 4000 parts of water. The solution is kept at 70° to 75° C. for 5 hours while stirring and there is obtained a highly viscous solution having the K-value 57 which can be diluted in any proportions with water to give clear solutions, does not flocculate out upon the addition of acids and leaves behind on drying a hard, transparent film.

The K-value of copolymers prepared in accordance with this example increases with increasing content of N-vinylpyrrolidone, as shown in the following Table II:

TABLE II

| Ratio of N-vinylpyrrolidone:methacrylamide: | K-value |
|---|---|
| 10:90 | 35.5 |
| 20:80 | 41.5 |
| 30:70 | 52.0 |
| 40:60 | 61.0 |
| 50:50 | 71.5 |
| 70:30 | 82.0 |
| 80:20 | 89.5 |
| 90:10 | 97.5 |

EXAMPLE 2

40 parts of N-vinylpyrrolidone, in which are dissolved 4 parts of azo-bis-isobutyronitrile, are added to a solution of 160 parts of methacrylamide in 800 parts of water. This solution is kept at 75° C. for 5 hours while stirring. A highly viscous solution having the K-value 41.5 is obtained which remains clear in the entire pH range.

EXAMPLE 3

250 parts of N-vinylpyrrolidone, in which are dissolved 2 parts of azo-bis-isobutyronitrile, are mixed with a solution of 750 parts of methacrylamide in 4000 parts of water. This solution is kept for 5 to 7 hours at 75° C. while stirring. A clear viscous liquid having the K-value 51 is obtained which yields a clear colorless film on drying.

As may be seen from the following Table III, the

K-value undergoes only trivial alteration with variation in the catalyst concentration.

TABLE III

Percentage of azo-bis-isobutyronitrile (with reference to the monomer content): K-value
- 0.05 _____ 56.5
- 0.10 _____ 55.5
- 0.20 _____ 51.0
- 0.50 _____ 47.5

On the other hand there is a clear dependence of the K-value on the concentration at which polymerization is carried out, as shown by the following Table IV:

TABLE IV

Percentage concentration of the monomer in the aqueous solution: K-value
- 5 _____ 43.0
- 10 _____ 45.5
- 25 _____ 51.0
- 30 _____ 57.0

EXAMPLE 4

A solution of 900 parts of N-vinylpyrrolidone and 100 parts of methacrylamide in 4000 parts of water is polymerized with 2 parts of azo-bis-isobutyronitrile for 6 hours at 75° C. A highly viscous solution having the K-value 92 is obtained which is soluble both in the acid and alkaline ranges and leaves behind a clear, hard film. The viscosity of this solution is practically independent of the pH value.

EXAMPLE 5

A solution of 300 parts of N-vinylpyrrolidone, 100 parts of acrylamide and 600 parts of methacrylamide in 8000 parts of water is polymerized with 2 parts of azo-bis-isobutyronitrile for 5½ hours at 75° C. A highly viscous solution is obtained which is clear in the entire pH range, which has a K-value of 77 and which yields a clear, hard film.

EXAMPLE 6

A solution of 10 parts of N-vinylpyrrolidone, 45 parts of acrylamide and 45 parts of methacrylamide in 800 parts of water is polymerized as described in Example 4. A highly viscous solution is obtained which is clear in the entire pH range, which has a K-value of 116.5 and which leaves behind a clear, hard film.

In the following Examples 7–25, the copolymer of methacrylamide and N-vinylpyrrolidone employed in each example can be prepared in the same manner as set forth in the preceding Examples 1–6.

EXAMPLE 7

A mixture of 500 parts of vinyl propionate and 500 parts of water, to which have been added 10 parts of a copolymer of 30% of N-vinylpyrrolidone and 70% of methacrylamide, 1.25 parts of sodium acrylate and 2.50 parts of potassium persulfate is kept for 3 hours at 80° C. while stirring. A stable polymer dispersion is thus obtained; its density is 1.063 and its pH 4.7. The time of passage through a Ford viscosimeter measured as an indication of the viscosity, amounts to 51 seconds. The dispersion has a good stability to stirring and is compatible with pigments.

Good results are also obtained with copolymers of 90% of N-vinylpyrrolidone and 10% of methacrylamide and of 90% of methacrylamide and 10% of N-vinyl pyrrolidone.

EXAMPLE 8

A mixture of 200 parts of vinyl acetate and 200 parts of water, to which have been added 7 parts of crotonic acid, 3 parts of acrylic acid and 40 parts of a copolymer of 30% of N-vinylpyrrolidone and 70% of methacrylamide as well as 5 parts of potassium persulfate, is adjusted to pH=4.8 with ammonia. The mixture is then heated to 68° C. while stirring. The temperature gradually rises to 90° C. under reflux. After 2 hours another 5 parts of potassium persulfate are added. Finally, after a reaction time of 3 hours in all, a stable polymer dispersion is obtained having good properties.

EXAMPLE 9

10 parts of a copolymer of 25% of N-vinylpyrrolidone and 75% of methacrylamide, 5 parts of the sodium salt of octodecanesulfonic acid, 5 parts of potassium persulfate and 3 parts of sodium pyrophosphate are dissolved in 1000 parts of water. 450 parts of this solution are mixed with 50 parts of vinyl propionate while stirring and then heated to 80° C. When the solution begins to become cloudy, a mixture of the remaining emulsifying liquid and 950 parts of vinyl propionate are added during the course of 2 hours at 80° C. When all has been added, the temperature is raised rapidly to 95° C.; the polymerization is thus completed. A stable polymer dispersion is obtained.

EXAMPLE 10

500 parts of vinyl propionate are polymerized for 3 hours at 80° C. while stirring in a solution of 10 parts of a copolymer of 30% of N-vinylpyrrolidone and 70% of methacrylamide in 500 parts of water which is stable to flocculation above pH 4.6, 1.25 parts of sodium acrylate and 2.5 parts of potassium persulfate. A stable polymer dispersion is obtained which does not settle out, which is stable to stirring and which is compatible with pigments.

EXAMPLE 11

2000 parts of ethyl acrylate are allowed to flow at 80° C. while stirring during the course of 3 hours into a solution of 20 parts of a copolymer of 70% of methacrylamide and 30% of N-vinylpyrrolidone, 20 parts of butenol and 4 parts of potassium persulfate in 2000 parts of water. A stable dispersion of polyacrylic acid ethyl ester is obtained.

EXAMPLE 12

600 parts of vinyl chloride are led into a mixture of 1400 parts of vinyl propionate and 2000 parts of water which contains 40 parts of a copolymer of 30% of methacrylamide and 70% of N-vinylpyrrolidone and 10 parts of potassium persulfate. The reaction mixture is then kept for 11 hours at 60° C. under an initial pressure of 4 atmospheres and while shaking. A stable polymer dispersion is obtained which can be spread well and yields a very waterproof film on drying.

EXAMPLE 13

25 parts of a 10% solution of di-isopropylnaphthalene sulfonic acid sodium salt are mixed with 75 parts of a 10% solution of a copolymer of 50% of N-vinylpyrrolidone and 50% of methacrylamide; 100 parts of olive oil are added while shaking vigorously and the whole then diluted until there is obtained, for example, a 30% oil emulsion.

EXAMPLE 14

20 parts of a copolymer of 40% of methacrylamide, 10% of acrylamide and 50% of N-vinylpyrrolidone and 10 parts of potassium persulfate are dissolved in 100 parts of water. 100 parts of vinyl propionate are emulsified in this solution. The whole is then heated while stirring and 900 parts of vinyl propionate are allowed to flow in at 75° to 80° C. in the course of 2 hours. After 3 hours in all, the polymerization is ended and a stable polymer dispersion is obtained which has good compatibility with pigments and yields a waterproof film on drying.

EXAMPLE 15

15 parts of a copolymer of 25% of methacrylamide, 5% of crotonamide and 70% of N-vinylpyrrolidone and 5 parts of potassium persulfate are dissolved in 500 parts of water. This solution is then mixed while stirring with 500 parts of vinyl propionate and heated at 80° C. for 3 hours while stirring. A stable polymer dispersion is obtained.

EXAMPLE 16

A mixture of 250 parts of vinyl propionate and 250 parts of vinyl acetate is allowed to flow during the course of 3 hours at 80° C. while stirring into a solution of 20 parts of a copolymer of 24 parts of methacrylamide, 6 parts of fumaric acid diamide and 70 parts of N-vinylpyrrolidone, as well as 5 parts of potassium persulfate in 500 parts of water. A stable polymer dispersion having good compatibility with pigments is obtained.

EXAMPLE 17

A mixture of 50 parts of a paraffin having a melting point of 56° C., 49 parts of a 10% aqueous solution of a copolymer from 70 parts of N-vinylpyrrolidone and 30 parts of methacrylic acid amide, and 1 part of an ethylene oxide treated castor oil is heated to 57° to 63° C. until the paraffin has melted. On stirring a creamy, easy-flowing and well spreadable paraffin emulsion is obtained which is very stable and compatible also with any conventional synthetic rubber latex. It can be diluted with water in any desired degree.

EXAMPLE 18

50 parts of a condensation product from phthalic acid, glycerine and linseed oil fatty acid are combined at 60° C. while stirring, with 50 parts of a 10% solution of a copolymer from 70 parts of N-vinylpyrrolidone and 30 parts of methacrylic acid amide. The product obtained is a creamy, easy-flowing, well spreadable emulsion which can be used as a paint binder.

EXAMPLE 19

50 parts of the butyl ester of 2.4-dichlorophenoxyacetic acid are mixed with 5 parts of an ethylene oxide treated castor oil and to this mixture 45 parts of a 10% solution of a copolymer from 70 parts of N-vinylpyrrolidone and 30 parts of methacrylic acid amide are added with vigorous agitation. The product obtained is a stable emulsion which is adequate dilution, say in a dilution of 1:200, can be used as a weedkiller.

EXAMPLE 20

20 parts of a copolymer from 95 parts of N-vinylpyrrolidone and 5 parts of methacrylamide with a K-value of 89.3, and 1.5 parts of potassium persulfate are dissolved in 450 parts of water and the solution is heated to 80° C. Then 500 parts of vinylpropionate and a solution of 1.5 parts of potassium persulfate in 50 parts of water are added to the solution over a period of 90 minutes while maintaining the same temperature. The creamy dispersion thus obtained does not separate into its constituent parts on standing.

The copolymer used as a dispersing agent is prepared as follows:

5 parts of methacrylamide and 95 parts of N-vinylpyrrolidone, the latter having 0.2 part of azodiisobutyronitrile dissolved in it, are dissolved in 400 grams of water and the solution is heated to 75° to 78° C. for 5 hours and 45 minutes. The coplymer thus obtained as a highly viscous solution has a K-value of 89.3.

EXAMPLE 21

80 parts of a copolymer (K-value 93.5) consisting of 90% of N-vinylpyrrolidone and 10% of methacrylamide, and 10 parts of potassium persulfate are dissolved in 1,000 parts of water and to this solution 1,000 parts of vinyl-propionate are added at 78° to 80° C. over a period of 50 minutes, while stirring. A pasty polyvinylpropionate dispersion of high stability is thus obtained.

The copolymer is prepared as described in Example 20.

EXAMPLE 22

20 parts of a copolymer (K-value 113.5) from 45% of methacrylamide, 45% of acrylamide and 10% of N-vinylpyrrolidone are dissolved in 450 parts of water together with 1 part of potassium persulfate and to this solution 500 parts of vinylpropionate and a solution of 1.5 parts of potassium persulfate in 50 parts of water are added at about 80° C. over a period of 90 minutes, while stirring. A pasty polyvinylpropionate dispersion of high stability is thus obtained.

EXAMPLE 23

50 parts of a 20% aqueous solution of nitrocellulose in a mixture of 5 parts of toluene and 15 parts of methylacetate are mixed, while stirring, with 1 part of an ethylene oxide treated castor oil and 49 parts of a 10% aqueous solution of a copolymer (K-value 71.5) from 50% of N-vinylpyrrolidone and 50% of methacrylamide. A pasty emulsion of good brushing properties is obtained.

EXAMPLE 24

27 parts of a pigment composition containing 37% of a phthalocyanine dyestuff are combined with 22.5 parts of a 20% aqueous solution of a copolymer (K-value 75.0) from 60% of N-vinylpyrrolidone and 40% of methacrylamide and 50.5 parts of water and then intimately mixed in a paint grinder. The paint dispersion obtained has high stability and can be thinned or mixed with painting emulsions in all proportions prior to use.

EXAMPLE 25

20 parts of a pigment mixture, which consists of equal parts of ferric oxide and titanium dioxide, are intimately mixed with 80 parts of a 10% aqueous solution of a copolymer (K-value 82.0) from 70 parts of N-vinylpyrrolidone and 30 parts of methacrylamide. A stable dispersion is obtained which can be thinned with water in all proportions prior to use and by itself be used as a paint or in combination with other paints.

EXAMPLE 26

The following comparative tests illustrate the absolute necessity of employing the copolymers of the invention with a K-value above about 25 and preferably above 35.5 as measured in a 1% aqueous solution at pH 7.0. The copolymer dispersing agent in part (a) is obtained by procedure (1) below while the copolymer in part (b) is obtained by procedure (2). This example further illustrates the unsatisfactory results which will be caused by failure to observe the precautions noted above when polymerizing methacrylamide and N-vinylpyrrolidone with a peroxide catalyst.

(a) parts of a copolymer (K-value 18.1) from 30% of methacrylamide and 70% of N-vinylpyrrolidone, and 1 part of potassium persulfate are dissolved in 450 parts of water. The solution is then heated to 80° C. and while maintaining this temperature 500 parts of vinylpropionate and a solution of 1.5 parts of potassium persulfate in 50 parts of water are added over a period of 90 minutes, while stirring.

The dispersion obtained is very thinly liquid and separates into its constituent parts after standing for only 40 hours.

(b) Equally poor results are obtained by dissolving 20 parts of a copolymer (K-value 20.8) from 50% of methacrylamide and 50% of N-vinylpyrrolidone in 450 parts of water together with 1.5 parts of potassium persulfate, heating the solution to 80° C. and adding to it, while maintaining this temperature, 500 parts of vinylpropionate and a solution of 1.5 parts of potassium persulfate in 50 parts of water over a period of 90 minutes, while stirring.

The dispersion obtained is very thinly liquid and separates into its constituent parts after standing for only 48 hours.

The two copolymers used as dispersing agents in the above comparative tests are prepared as follows:

(1) 30 parts of methacrylamide, 70 parts of N-vinylpyrrolidone and 1.5 parts of potassium persulfate are dissolved in 400 parts of water. After heating for 4 hours and 15 minutes at 73° C., a low-viscosity solution of the corresponding copolymer is obtained. The copolymer has a K-value of 18.1.

(2) 50 parts of methacrylamide, 50 parts of N-vinylpyrrolidone and 1.5 parts of potassium persulfate are dissolved in 400 parts of water and the solution is heated to 74° to 75° C. and kept at this temperature for 4 hours and 40 minutes. A clear low-viscosity solution of the corresponding copolymer is obtained. The copolymer has a K-value of 20.8.

It is essential that the copolymers of the invention have a K-value of at least 25, and preferably at least about 35.5, in order to provide a high-molecular weight copolymer having the desired properties. Also, it will be apparent from the foregoing description and examples that this high-molecular weight copolymer can only be obtained by employing an azo-bisnitrile catalyst.

The water-soluble copolymers of methacrylamide and n-vinylpyrrolidone when produced according to the invention, as set forth in the preceding description and examples, are useful by themselves in the formation of films or the like from a highly viscous solution. However, the copolymers of the invention are particularly useful as protective colloids or dispersing or emulsifying agents in forming aqueous emulsions or dispersions of a wide variety of water-insoluble substances, including water-immiscible liquids as well as finely divided or powdered solids. Their utility as the emulsifier in the emulsification polymerization of water-insoluble monomers is especially important because of the good solubility of the new copolymers over the entire pH range.

The properties of the copolymers of methacrylamide and n-vinylpyrrolidone can be further modified by the inclusion in the polymer of at least one other monoethylenically unsaturated carboxylic acid amide having 3 to 4 carbon atoms, provided that the proportion of this added component is not greater than the proportion of methacrylamide, and, in any event, not greater than 50% by weight of the polymer. Again, the polymerization is preferably carried out with an azo-bisnitrile catalyst in order to obtain high-molecular weight products having a K-value of at least 25, or better 35.5 or more. The resulting mixed copolymers containing three or more monomeric components are likewise highly useful in producing films, in preparing aqueous emulsions of water-insoluble substances, and in carrying out emulsion polymerizations.

In every case, the copolymers of the invention can be easily prepared with good yields by following the directions set forth herein for polymerization. These copolymers have a very wide range of application as will be readily apparent to those skilled in the art in view of the specific examples and description of the invention.

This application is a continuation-in-part of our application, Serial No. 448,752, filed August 9, 1954, now abandoned.

The invention is hereby claimed as follows:

1. A process for the production of a high-molecular weight water-soluble copolymer which comprises copolymerizing (A) methacrylamide and (B) from at least 10% up to about 90% by weight of n-vinylpyrrolidone, with reference to the total weight of monomers, in aqueous solution at a temperature between 20° C. and 150° C. and in the presence of an azo-bisnitrile catalyst, whereby the resulting copolymer has a K-value of at least about 35.5.

2. A process for the production of a high-molecular weight water-soluble copolymer which comprises copolymerizing (A) about 90 to 10% by weight of methacrylamide and (B) about 10 to 90% by weight of n-vinylpyrrolidone, with reference to the total weight of monomers, in aqueous solution at a temperature of about 40° C. to 100° C. and in the presence of an azo-bisnitrile catalyst, whereby the resulting copolymer has a K-value of at least about 35.5.

3. A process as claimed in claim 2 wherein the azo-bisnitrile catalyst is a member of the group consisting of azo-bis-isobutyric acid nitrile, azo-bis-diethylacetic acid nitrile, azo-bis-cyclohexane carboxylic acid nitrile and azo-bis-$\alpha$-phenylpropionic acid nitrile.

4. A process as claimed in claim 2 wherein there is also copolymerized in addition to methacrylamide less than 50% by weight of at least one other ethylenically-unsaturated carboxylic acid amide selected from the group consisting of acrylamide, crotonamide and fumaric acid diamide in a quantity not greater than the proportion of said methacrylamide, with reference to the total weight of monomers.

References Cited in the file of this patent

UNITED STATES PATENTS

| | | |
|---|---|---|
| 2,335,454 | Schuster | Nov. 30, 1943 |
| 2,500,023 | Burk | Mar. 7, 1950 |
| 2,592,526 | Seed | Apr. 15, 1952 |
| 2,719,831 | Craemer | Oct. 4, 1955 |
| 2,739,922 | Shelanski | Mar. 27, 1956 |

UNITED STATES PATENT OFFICE
CERTIFICATE OF CORRECTION

Patent No. 3,006,900                October 31, 1961

Hans Fikentscher et al.

It is hereby certified that error appears in the above numbered patent requiring correction and that the said Letters Patent should read as corrected below.

Column 1, lines 41 and 42, for "unsautrated" read -- unsaturated --; column 6, line 62, for "100" read -- 1000 --; column 7, line 41, for "is" read -- in --; column 8, line 49, before "parts" insert -- 20 --; column 10, line 13 and lines 22 and 23, for "n-vinylpyrrolidone", each occurrence, read -- N-vinylpyrrolidone --; line 36, for "unsaurated" read -- unsaturated --.

Signed and sealed this 24th day of April 1962.

(SEAL)
Attest:

ESTON G. JOHNSON               DAVID L. LADD
Attesting Officer               Commissioner of Patents